United States Patent
Elliott

(10) Patent No.: US 10,661,756 B2
(45) Date of Patent: May 26, 2020

(54) AUTOMOTIVE WINDSHIELD WIPER RESTORER

(71) Applicant: Rick Elliott, Kentfield, CA (US)

(72) Inventor: Rick Elliott, Kentfield, CA (US)

( * ) Notice: Subject to any disclaimer, the term of this patent is extended or adjusted under 35 U.S.C. 154(b) by 140 days.

(21) Appl. No.: 15/581,700

(22) Filed: Apr. 28, 2017

(65) Prior Publication Data

US 2017/0225655 A1    Aug. 10, 2017

Related U.S. Application Data

(60) Provisional application No. 62/329,751, filed on Apr. 29, 2016.

(51) Int. Cl.
*B60S 1/38* (2006.01)
*B60S 1/04* (2006.01)

(52) U.S. Cl.
CPC ..... *B60S 1/0483* (2013.01); *B60S 2001/3846* (2013.01)

(58) Field of Classification Search
CPC ................ B60S 2001/3846; B60S 1/0483
See application file for complete search history.

(56) References Cited

U.S. PATENT DOCUMENTS

| | | | |
|---|---|---|---|
| 3,886,657 A | 6/1975 | Fabian |
| 4,604,802 A | 8/1986 | Samuelsson |
| 4,617,765 A | 10/1986 | Weiler |
| 5,251,351 A | 10/1993 | Klotz |
| 5,359,776 A | 11/1994 | Glazer |
| 5,848,471 A | 12/1998 | Freeland |
| 6,322,266 B1 | 11/2001 | Traynor |
| 7,125,327 B2 | 10/2006 | Wu |
| 2007/0173186 A1 | 7/2007 | Lin |
| 2011/0217912 A1 | 9/2011 | Dai |

*Primary Examiner* — John C Hong
(74) *Attorney, Agent, or Firm* — Steven A. Nielsen; www.NielsenPatents.com

(57) ABSTRACT

An automobile windshield wiper restorer may take the form of a hand held device that offers a compound curvilinear rectangular three sided resurfacing channel and a flat bottom rectangular three sided resurfacing channel, with both channels coated with abrasive materials on all three sides. The flat bottom channel may have a coarse grit and the compound curvilinear channel may have a fine grit. Water or a wiper solution may be used while moving a wiper through the device. Drawing or swiping the entire length of a windshield wiper blade multiple times back and forth, while wet, through the appropriate support and honing channels removes surface contaminants and imperfections uniformly, thereby restoring the wiper blade to its original functionality.

7 Claims, 3 Drawing Sheets

100

200

6

235
212
225

AUTOMOTIVE WINDSHIELD WIPER RESTORER

RELATED PATENT APPLICATION AND INCORPORATION BY REFERENCE

This is a utility application based upon U.S. patent application Ser. No. 62/329,751 filed on Apr. 29, 2016. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to methods and systems to restore windshield wipers. More particularly, the invention relates to the construction and use of a portable windshield wiper restoring system having a first compound curvilinear restoring channel defined by three sides of relatively fine texture and a second compound restoring channel defined by three sides of relatively coarse texture.

(2) Description of the Related Art

U.S. Pat. No. 5,359,776 granted to Glazar attempts to restore wiper blades by utilizing a single fixed blade design which cuts the lower or narrow portion of the wiper blades, only. The Glazar tool can produce non-uniform results due to differing blade thicknesses and shortfalls associated with flexibility and rigidity of automotive wiper blades. If one depresses too firmly upon the wiper blade, the Glazar tool can overcut. If one depresses too lightly upon the wiper blade, the Glazar tool can undercut or fail to cut. The cut depths are fixed on the single blade design. The possibility and need to reverse the device's direction and cut the wiper blade from the opposite direction to achieve a balanced cut is at best, unreliable.

U.S. Pat. No. 4,604,802 granted to Samuelsson may be viewed as a squeegee blade trimmer and accomplishes a single use operation which is to re-cut the lower or narrow edge of a window squeegee blade and renew the edge of the blade by cutting the original single, narrow lower profiled edge only. Window squeegee replaceable blades are generally thicker and stiffer by design. This allows for the cutting of such blades more accuracy and with effective results. Unfortunately, the squeegee blade trimer by Samuelsson is of little use for the restoration of automotive windshield wiper blades.

Other wiper blade treatment systems of the prior art include U.S. Pat. No. 3,886,657 granted to Fabian, U.S. Pat. No. 4,617,765 granted to Weiler, U.S. Pat. No. 5,251,351 granted to Klotz, U.S. Pat. No. 5,848,471 granted to Freeland, U.S. Pat. No. 6,322,266 granted to Traynor, U.S. Pat. No. 7,125,327 granted to Wu, U.S. Pat. No. 8,491,361 granted to Sylvester, U.S. Published Patent Application 20070183186 by Lin and U.S. Published Patent Application 20110217912 by DAI.

Burnishing the wiper blade within a wire brush device or similar abrasive pad materials such as a 3M Scotch-Brite does not serve the same purpose. The wiper blade is embedded in these materials via a slot and is essentially "scoured" along the length of the blade. This does not accomplish the function of re-honing the blade equally on all sides while providing a renewed edge which is critical to the purpose of restoring and refinishing the wiper blade.

Presently, all automotive wiper blades differ in width and design. Rigidity properties make it unfeasible to cut different blades that are of varying thicknesses and depths with a single fixed blade cutting design. Presently, no prior art for a single hand held device offers a dual or two option surface restoration arrangement which is achieved utilizing two different abrasive materials of differing grits for a single purpose of restoring automotive wiper blades on all three sides simultaneously in a uniform manner.

The known prior art fails to provide the disclosed three sided resurfacing systems of the presently disclosed embodiments. The prior art follows a "one surface works for all" theory that fails to account for real world conditions.

BRIEF SUMMARY OF THE INVENTION

The present invention overcomes shortfalls in the related art by presenting an unobvious and unique combination, configuration and use of new restorer device comprising two resurfacing options that remove heavy impurities or damage and minor defects and minor impurities on all sides of the blade simultaneously within a first compound curvilinear three sided resurfacing channel and second single or flat three sided channel arrangement.

Wiper blades while in use deform and bend according to which direction the blade is operating. In a forward motion, the blade deflects in the opposite direction due to the friction and force that is being applied or encountered by the windshield. Similarly, in the reverse direction, the same effect is applied in the opposing direction of travel causing the blade to bend or deflect in the opposite direction of the forces being applied.

The leading edge of the blade is not the only surface which is in contact with the windshield as the wiper changes directions. Contaminants on the three sides of the blade are also affecting the performance of the blade. The restoration process can only be achieved properly when the entire blade is restored on all three sides which are in contact with the windshield glass.

Thus, the presently disclosed embodiments overcome shortfalls in the prior art by resurfacing and/or honing of the blade simultaneously on all three sides during one restoration operation.

The presently disclosed embodiments overcome shortfalls in the art by the artful use of a first compound curvilinear restoring channel defined by three sides of fine texture and a second compound restoring channel defined by three sides of relatively coarse texture. More particularly, the first channel may be defined by three surfaces that may all be of compound curvilinear shape. For example, the back wall may bow inwardly at the center or medial area and outwardly at the distal ends. The top and bottom surfaces may bow outwardly at the distal ends and inwardly at the center or medial area. This compound curvilinear configuration, at all three planes, provides unexpectedly excellent results in trimming or honing the top edge of blade as well as the two vertical sides of a blade. As a wiper blade is moved through the compound curvilinear channel, the compound curvilinear configuration more gently conditions the blade during the swiping process and the fine surfaces are introduced to the wiper in an arcuate rotation, wherein the angle between the blade and wiper is gently increased so as to prevent breakage caused from abrupt contact between the blade and fine surfaces. The larger gaps or void areas at the distal ends, at all three planes allows for excellent results when the blade is moved in either longitudinal direction within the first channel, allowing for a time efficient back and forth swiping of the blade. This, during movement in either direction, all three sides of a blade are gently rotated to the more extreme angles at the center or medial section of the channel. Thus, more fine surfaces may be used as compared to the linear prior art channels and the presently disclosed embodiments allow for faster resurfacing by artfully accommodating efficient back and forth swiping or blade movement.

The following fundamental factors support the efficacy and unique nature of the disclosed embodiments. Such factors include:

When a straight surface is subjected to a curved plane it naturally exhibits a tendency to deflect. For example, this characteristic can be observed when a piece of straight flat sheet metal is forced into a curved arc position along its leading straight edge. It deflects along this lateral edge in the opposing direction away from the forces being exerted upon it. This is in part in response to the inherent inflexibility of any straight edge profile and the resistance to these bending forces while being supported and formed into a channel that is inflexible or fixed in its dimensional profile; and Wiper blades in their natural state are in a straight plane along the leading edge. When installed in a tensioner frame and while resting on a windshield they take on the profile of any slight curvature of the glass which can vary based upon where the blade is resting.

The disclosed embodiments overcome shortfalls in the art by use of a first channel having a convex plane within the lower or narrow side of the channel that the subject device places the wipers into during the process of restoration is in a perpendicular axis to this single lower plane. This in turn causes the blade to deflect in a corresponding manner from side to side while the arc within this channel is generating tension on the lower leading edge portion of the blade. This deflection originates from the highest point of the centerline along the arc laterally to each side of the deflection or lower point of this ventral axis. Located in the centerline the apex of the arc, it causes the blade to twist in opposing directions from the center line outward of this axis point. It is not the objective to determine in what direction this deflection will take place but rather to allow for this deflection by providing sufficient space in the lateral areas to the right and left of the apex of the arc that lies within the channel. This then accounts for this deflection by means of a wider opening gradually radiating out from the center. Without this additional space consideration and allowance it will cause an uneven or excessive resurfacing on the opposing sides of the blade where the tension and twist is taking place. While in tension, the blade will naturally deflect due to it being placed in a curved plane against this natural state and profile. Thus, the first channel overcomes shortfalls in the art by using compound curvilinear honing surfaces to better position and to support the blade during the honing process. The blade positioning mimics the real world conditions of a blade disposed upon an arched windshield.

Disclosed embodiments overcome shortfalls in the art by use of a design that incorporates a double compound channel with curvilinear angles within this three sided honing channel, the channel defined by two opposing sides of the channel and one bottom side. While being resurfaced the sides of the blade are supported in a graduating and expanding plane from the centerline outward, toward the exterior edges of these channels thereby establishing the subject devices' unique method of construction by which to attain these properties within the channels of the disclosed embodiments.

The subject device and resurfacing channels allows for this deflection in the blade by providing additional space for this deflection. This is unique to the subject device. The blade can now deflect without being subject to non-uniform or excessive resurfacing properties to any particular side of the blade which would then result in over abrasion and non-uniform honing of the wiper blade. Thus, the first channel overcomes shortfalls in the prior art by defining arched voids by use of curvilinear surfacing elements, such as curvilinear back wall, curvilinear bottom wall and curvilinear top wall.

These resulting outlined properties are accounted for in the subject device's support and restoration channel or first channel. The disclosed first channel is slightly wider on the outer right and left edges than in the center, or apex, which is primarily performing the equilateral surface restoration only at the center or high point of this channel. Material loss is substantially brought to a minimum and uniform honing and restoration processes are improved as a direct result of this unique feature.

This effect can best be described of as the X-axis within the receiving channel where the center is a smaller dimension and the two outside areas of the receiving channels are wider in width within an opposing curved or convex side channels. When combined, this compound curvilinear feature within a convex base of a three sided abrasive resurfacing channel makes the subject device unique and unlike all previous disclosures to date. It addresses all of the potential problems associated with restoring automotive windshield wiper blades in a dependable single process that offers the smoothest or least resistive method to accomplish this function and in turn is the least destructive to original properties of the blade.

All prior art and submissions fail to account for the three sided function of the subject device which hones the blade sides simultaneously while utilizing water in one flat and one curvilinear channel arrangement incorporated into one singular device. The abrasive materials are initially in a powder form being applied into theses channels with a resin bonding process.

Figure 1:
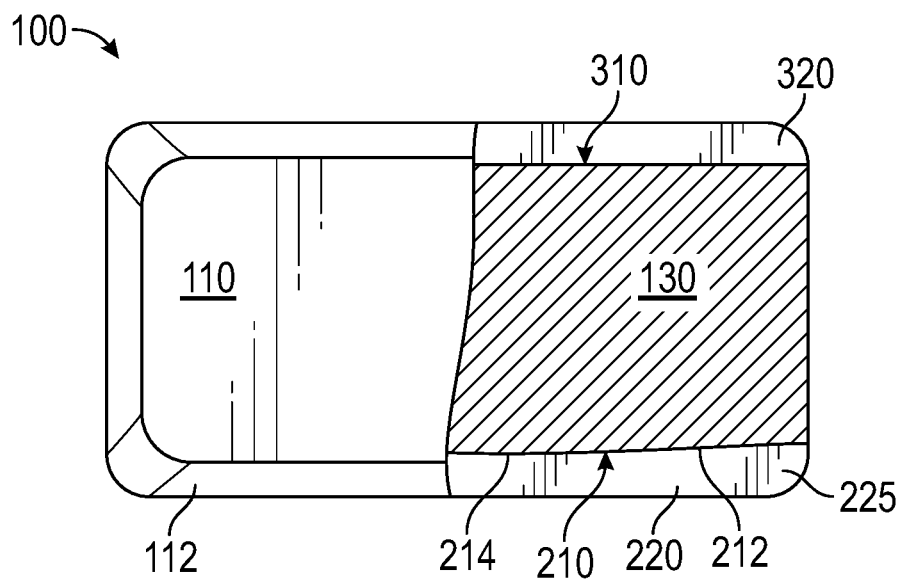
FIG. 1 is a plan view showing one embodiment of the invention in a partial sectional view

REFERENCE NUMERALS IN THE DRAWINGS 100 a disclosed embodiment
110 top piece
112 cambered edge of top piece
120 bottom piece
122 cambered edge of bottom piece
130 center piece or center surfacing component
200 curvilinear or compound curvilinear channel
210 back surface of curvilinear channel
212 inwardly arched outer edge or outer distal areas of back surface 210 of curvilinear channel 200
214 straight medial edge of back surface 210 of curvilinear channel 200 21310
220 lower curvilinear wall of curvilinear channel 200
225 lower distal areas having a downward curvilinear curve of lower curvilinear wall 220
227 raised apex area of lower curvilinear wall 200
230 upper curvilinear wall of curvilinear channel 200
235 raised distal area of upper curvilinear wall 230 or upward curvilinear curves at distal areas of the upper curvilinear wall
237 lowered apex area of upper curvilinear wall 230
300 linear channel
310 back wall of linear channel 300
320 lower wall of linear channel 300
330 upper wall of linear channel 300

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Automotive windshield wipers become impregnated with road and surface contaminants causing streaks and interruptions on the windshield during use. The disclosed embodiments solve this problem by removing these contaminates and restoring the blade's edges to a close approximation of factory specifications and original smooth operating condition as is practically possible.

This invention is a dramatic and unobvious improvement from the prior art. The invention has three cutting surfaces incorporated into two elongated rectangular channels of particular dimension that support the blade during restoration process while maintaining the rigidity of the blade regardless of its dimensional profile. All sides of the blades are resurfaced simultaneously producing a uniform and superior result with less potential for damage and the possibility of partial and permanent deformation of the soft rubber blade. Should damage be sustained to the soft wiper blade during the fixed blade cutting and restoring process, or in a more traditional single or one sided process that restores only the lower edge of the blade, it could render the wiper blade useless or less effective at best.

Prior art single cutting blade devices do not address issues that arise from nicks or cuts that may be present on the leading or lower narrow (short) edge of the blade. This will require removing significant amounts of materials from the entire blade that often produces undesired results. Uniform cutting properties of a disclosed device using a first curvilinear channel allows for concentration on a particular area without subjecting the entire wiper blade to further damage which can result from excessive resurfacing in one particular area of the blade. To restore the rubber wiper blades to a useable condition it is necessary that all three sides of the blade are honed and restored simultaneously. Uniformly is therefore guaranteed for proper operation and function of the blade without further damaging the original useful properties of the wiper blade.

The flat channel or slot which is designed to cut and polish only one singular or narrow lower edge of the wiper blade with either and abrasive or single blade cutting methods are presently the only disclosed methods for accomplishing the objective of renewing and restoring wiper blades.

Disclosed embodiments include:

1. One side of the wiper restorer has a coarse grit aluminum oxide or similar abrasive embedded into a slot of particular dimension and on the reverse side, it has a fine grit fused aluminum oxide or similar abrasive material embedded into a slot of particular dimension for the purpose of polishing and honing the wiper blade utilizing water to perform the function of the device.

2. The device has a dual function to aid in the restoration of all single blade automotive and truck windshield wiper blades utilizing a compound convex channel and flat channel incorporated into one device which serve two different functions or purposes.

3. The injection molded hand held polystyrene apparatus is a dual function device designed for easy use and maintenance of automotive wiper blades utilizing water or a similar windshield cleaning solution to achieve the desired effect leaving the blade in a like new reusable condition. Disclosed embodiments include the design, construction and use of an arched or curved channel and a flat channel which is impregnated with powdered abrasive materials on three sides in each channel.

Disclosed functions include:

The coarse (cutting) removal process involves a more aggressive abrasive medium and accomplishes the resurfacing necessary due to nicks and/or heavy buildup of contaminates. The fine (buffing) process involves a fine fused abrasive material designed for resurfacing or honing to establish a polished or fine edge on the wiper blade. This results in a streak-free and skip-free effect on the windshields' glass during use.

Disclosed Methods of Manufacture Include:

A disclosed embodiment may be made by hand in a similar fashion by creating two slots or channels of appropriate length and width and arc on any hard support material and then applying an aluminum oxide or similar grit material or similar abrasives which are highly durable and less subject to wear while utilizing water as to aid in sanding and honing. A resin bond or similar process may be used for adhering the abrasive powder materials to a hard backing and can be subjected to water with no appreciable effect on the sanding and honing properties involved.

The dual sides are not required to be incorporated into one device. A disclosed embodiment may be made using two single devices independently with the same coarse or fine buffing properties achieving the same results.

The polishing and cutting aspects of the device are interchangeable in terms of which side they are on with little or no effect to the end results. Abrasive materials are placed in a slightly arced or convex channel arrangement creating more surface contact with the wiper blade during the polishing process. The arc's dimensional degree and width is correspondent to the width of the subject device and the contact surface area that is achieved during use.

Disclosed Methods of Use Include:

Swiping or drawing a single auto wiper blade along its entire length through the appropriate slot(s) multiple times to achieve the desires results utilizing water or a windshield cleaning solution thereby cleaning and resurfacing the blade on all sides for a streak-free and skip-free results on the automotive windshield glass.

Additionally, any rubber or silicone based single blade design devices, such as a window cleaning squeegee blade, can be restored to functioning as new with a disclosed embodiment.

Further advantages over the prior art can be seen by review of the drawings and related descriptions of the drawings.

Referring to FIG. 1, a disclosed embodiment 100 may comprise a top piece 110 fastened or attached to a center piece 130 or center surfacing component. The center piece 130 may define a back wall 310 or back surface for the second channel and the center piece 130 may define a back wall 210 or back surface for the first curvilinear channel. The top piece may have a cambered edge 112 which is helpful in handling the device.

The use of the center surfacing component 130 provides a structural advantage in providing two back surfaces 210 and 310 in one stone or work piece and by providing a top and back surface that is easily attached to a top piece 110 and bottom piece 120 to create an effective form factor for use by hand. The cambered edges 112 and 122 of the top and bottom pieces provides a mechanical advantage in creating a form factor that is conducive to a human hand using the device.

Figure 2:
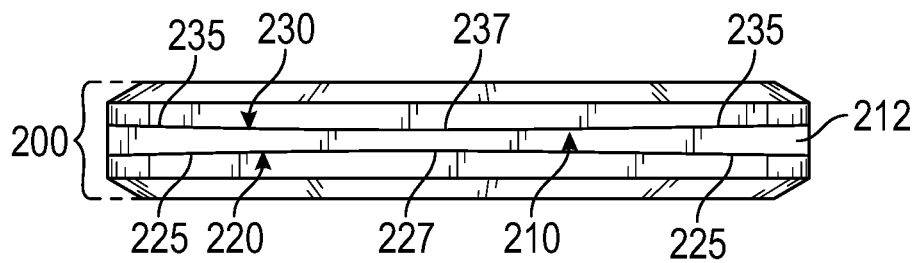
FIG. 2 is a side view of a first curvilinear channel

Referring to FIG. 2, a curvilinear or multi curvilinear channel 200 may be defined by a back wall 210, a lower curvilinear wall 220 and an upper curvilinear wall 230. The back wall may bow inwardly toward the center and the upper and lower walls may bow inwardly toward the center and outwardly toward the distal ends. As mentioned above, this configuration provides advantages over the prior art in more gently applying fine girt or fine surfaces in the wiper restoration process and by flexing a blade in positions consistent with an end use of being applied to a arched windshield.

Figure 3:
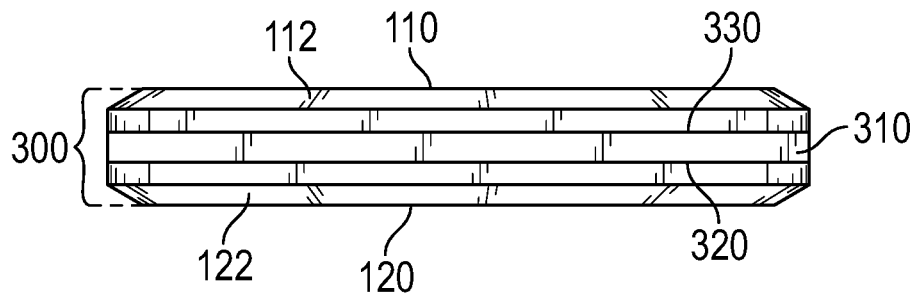
FIG. 3 is side view of a second channel

FIG. 3 depicts a second channel 300 defined by a back wall 310 or vertical wall, a lower wall 320 and an upper wall 330. A disclosed embodiment is shown having a top piece 110 having a cambered edge 112 and a bottom piece 120 having a cambered edge 122. A second channel 300 may be defined by a back wall 310 or vertical wall, a lower wall 320 and an upper wall 330.

Advantages over the prior art are achieved by use of fine grit material upon the defining surfaces of the first curvilinear channel and more coarse surfaces defining the second channel 200.

Figure 4:
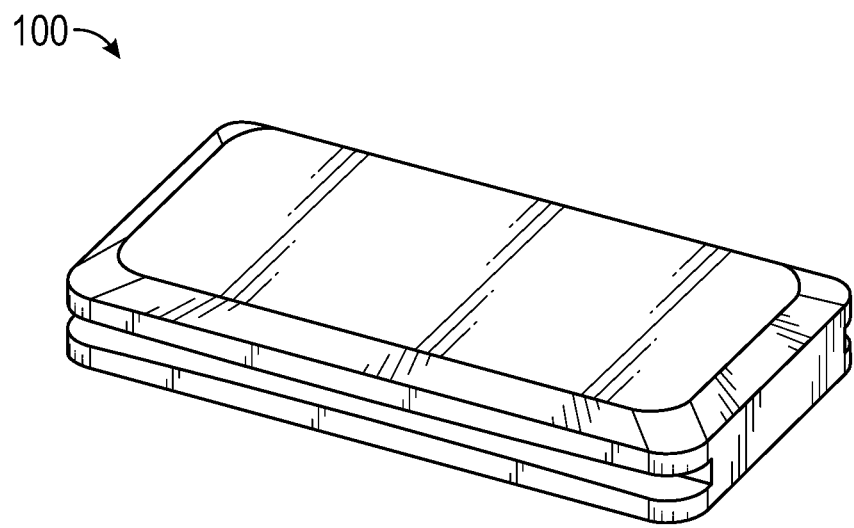
FIG. 4 is a side perspective view of a disclosed embodiment

FIG. 4 depicts a perspective view of a disclosed embodiment with the first curvilinear channel in the foreground.

Figure 5:
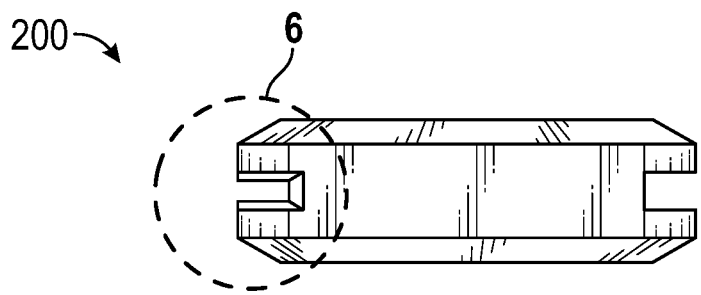
FIG. 5 is an end view of a disclosed embodiment

FIG. 5 depicts an end view of a disclosed embodiment with a first curvilinear channel 200 on the left hand side.

Figure 6:
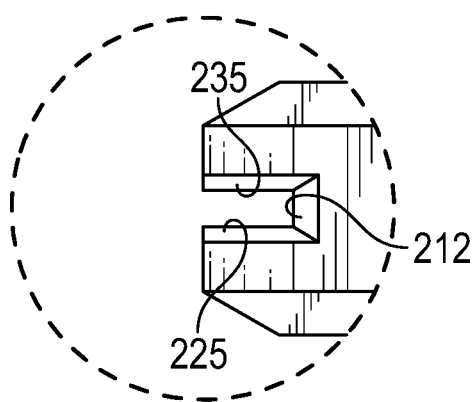
FIG. 6 is an expanded view of a section from FIG. 5

FIG. 6 depicts an expanded end view of a first curvilinear channel and further depicts an inwardly arched outer edge 212 of a back wall 210 or vertical wall; a lower distal area 225 of a lower curvilinear wall 220; and, a raised distal area 235 of an upper curvilinear wall.

Figure 7:
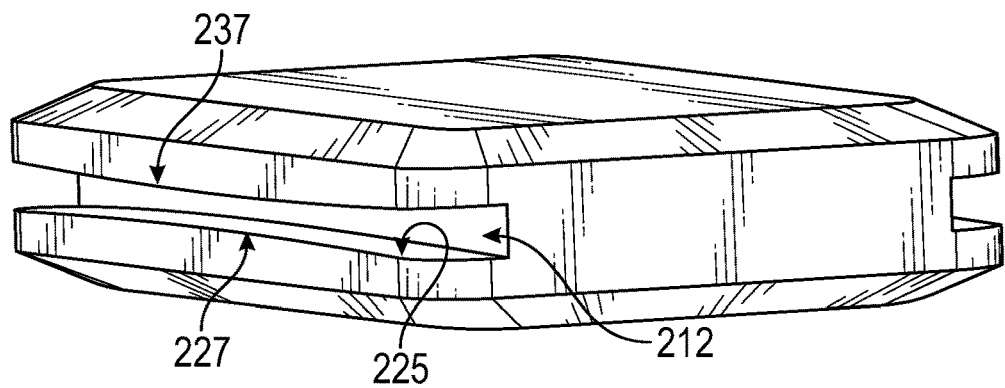
FIG. 7 is a side perspective view of a disclosed embodiment

FIG. 7 depicts a perspective view of a disclosed embodiment with a first curvilinear channel in the foreground. FIG. 7 depicts an inwardly arched outer edge 212 of a back wall or back surface; a lower distal area 225 of lower curvilinear wall, a raised apex area 227 of a lower curvilinear wall and a lowered apex area 237 of an upper curvilinear wall.

Figure 8:
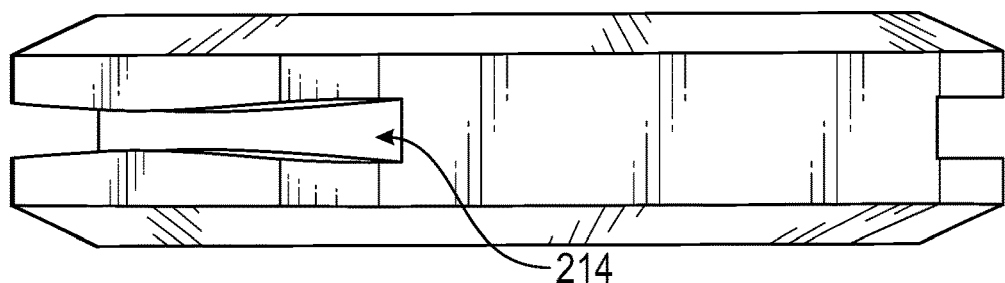
FIG. 8 is a side perspective view of a disclosed embodiment

FIG. 8 depicts a perspective view of a disclosed embodiment with a first curvilinear channel in the foreground.

Figure 9:
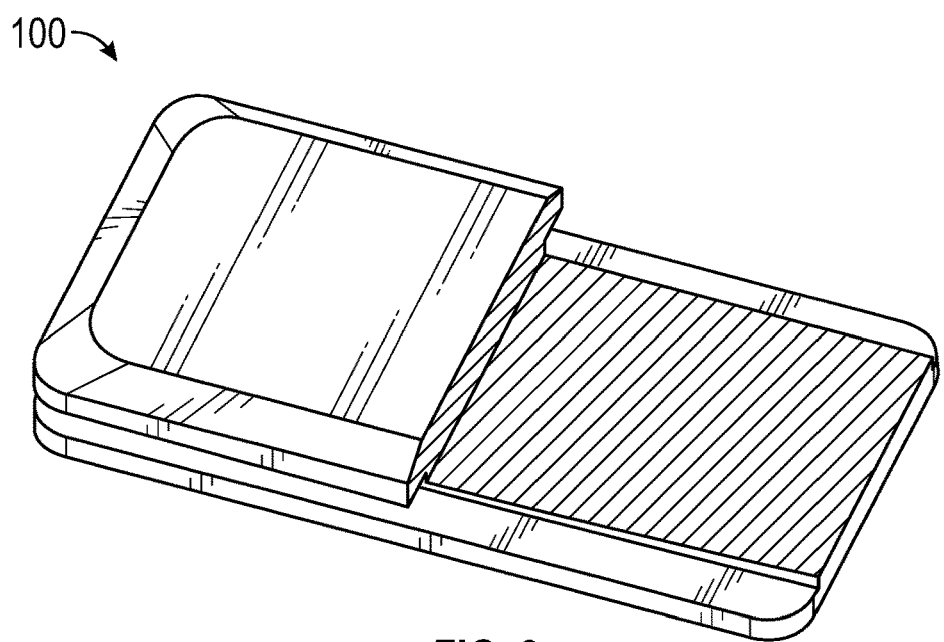
FIG. 9 is a sectional view of a disclosed embodiment

FIG. 9 depicts a sectional view of a disclosed embodiment.

In general, the second channel may be used first with a wiper that has nicks and other signs of wear. The second channel may have a more coarse surfacing and be defined by three linear walls, so as to clean and recondition to top edge or side of a wiper as well as the two vertical sides of a wiper. The second channel overcomes short falls in the art by supporting and honing all three sides of a wiper at the same time, so as to avoid over honing of any one side and to promote even honing of all three sides of a wiper blade.

The first channel overcomes shortfalls in the related art by allowing a wiper to be curved while honing and by supporting the curved wiper so as to avoid undue stress upon the wiper and to keep the wiper from being bound up or bent, which would interfere with the honing or reconditioning process. The artful compound curvilinear components that define the second channel allow a wiper to be honed in a curved position that emulates use upon a windshield, while supporting the curved wiper to avoid damage to the wiper.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Lines or walls 230 and 220 as shown in FIG. 2 comprise a continuous curvature.

What is claimed is:

1. An automotive windshield wiper restoration system, the system comprising:
   a first continuous curvilinear channel (200) defined by a continuous curvilinear back surface (210), a lower continuous curvilinear wall (220) and an upper continuous curvilinear wall (230) wherein:
   a) the continuous curvilinear back surface comprises a center area and two distal outer areas wherein the center area is relatively straight (214) and the two distal outer areas comprise inwardly arched outer edges (212);
   b) the lower continuous curvilinear wall comprises two outward distal areas with each distal area comprising a downward continuous curvilinear curve (225) and the lower continuous curvilinear wall comprises a center area having raised apex (227);
   c) the upper continuous curvilinear wall comprises two outward distal areas with each distal area comprising an upward continuous curvilinear curve (235) and the upper continuous curvilinear wall comprising a center area having a lowered apex (237).

2. The system of claim 1 wherein the continuous curvilinear back surface is defined by a center surfacing component (130) and the center surfacing component comprising a top side attached to a top piece (110) and the center surfacing component comprising a bottom side attached to a bottom piece (120).

3. The system of claim 2 wherein the top piece comprises a cambered edge (112) and the bottom piece comprises a cambered edge (122).

4. The system claim 2 wherein the three continuous curvilinear surfaces defining the first continuous curvilinear channel comprise a textured surface capable of honing an automotive windshield wiper.

5. The system of claim 2 wherein the three surfaces defining the first continuous curvilinear channel are comprised of compound continuous curvilinear surfaces.

6. The system of claim 2 further comprising a second channel (300), the second channel defined by a back wall (310), a lower wall (320) and an upper wall (330).

7. The system of claim 6 wherein the back wall of the second channel is defined by one side of the center surfacing component.

* * * * *